(No Model.)
W. A. PATTEN.
SUSPENDING DEVICE.
No. 374,809. Patented Dec. 13, 1887.
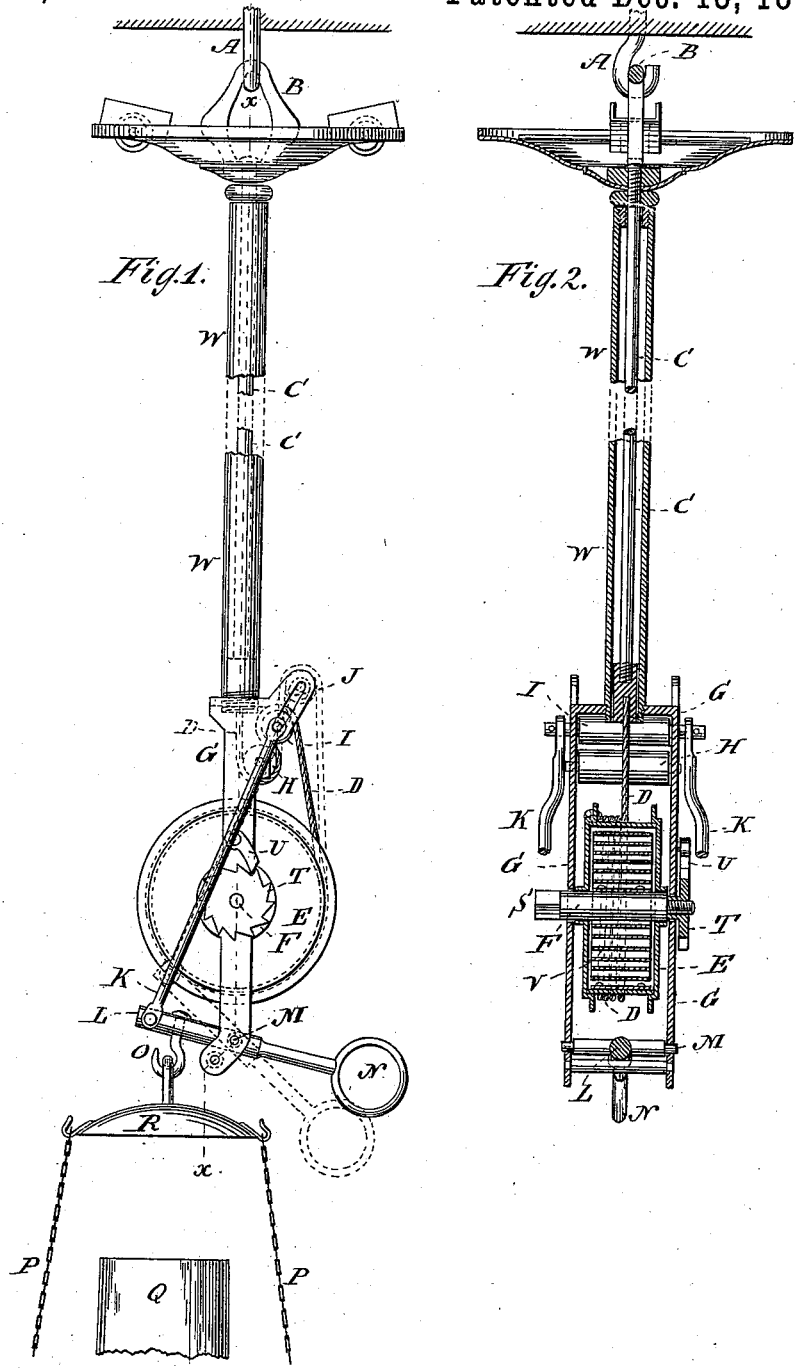
WITNESSES:
Edward Wolff
William Miller
INVENTOR
William A. Patten.
BY
Van Santvoord & Hauff
ATTORNEYS

UNITED STATES PATENT OFFICE.

WILLIAM A. PATTEN, OF ANSONIA, CONNECTICUT.

SUSPENDING DEVICE.

SPECIFICATION forming part of Letters Patent No. 374,809, dated December 13, 1887.

Application filed February 24, 1887. Serial No. 228,742. (No model.)

*To all whom it may concern:*

Be it known that I, WILLIAM A. PATTEN, a citizen of the United States, residing at Ansonia, in the county of New Haven and State of Connecticut, have invented new and useful Improvements in Suspending Devices, of which the following is a specification.

This invention relates to improvements in suspending devices, as set forth in the following specification and claims, and illustrated in the accompanying drawings, in which—

Figure 1 is a side elevation of a suspending device. Fig. 2 is a section in the plane $x\ x$, Fig. 1.

Similar letters indicate corresponding parts.

In the drawings, the letter A indicates an attaching device—such as a hook or eye—secured in a suitable place—as, for example, to the top or ceiling of a room.

B is an eye or attaching device engaging the attaching device A. A suspending medium—such as a fixed rod or bar, C, and a cord, rope, or chain, D—is secured to the attaching device B. By making the fixed end of the suspending medium rigid—as, for example, in the shape of a rod or bar, C—some degree of steadiness will be given to the device. The free end or portion of the suspending medium is taken up by a drum, E. A carriage or frame, G, supports the shaft or axle F of the drum E. In the drawings, a spring, V, is shown as adapted to actuate the drum E so as to wind or take up the free end of the suspending medium. By means of a head, S, shaped to receive a key, the shaft F can be rotated so as to give desired tension to the spring V. A ratchet, T, and pawl U are adapted to retain the spring V at a given tension.

The frame or carriage G is adapted to travel away from or toward the attaching device B. By having the carriage or frame G provided with a sleeve or support, W, adapted to move along the fixed part C of the suspending medium, the carriage G will to some degree be steadied.

The letters H I indicate pulleys, between which the cord D passes. One of the pulleys—as, for example, the pulley I—is movable toward and from the other pulley. The tension given to the cord D by the spring V draws the pulleys H I together, so that the cord D is clamped between said pulleys and held in a fixed position. Suitable guides, which, as shown, are in the form of slots J, are provided in an extension of the frame G for the movement of the movable pulley.

To relieve the cord D from the engagement of the pulleys H I, said pulleys are separated or disengaged from one another. In the drawings is shown a lever, L, having a pivot or fulcrum, M, and connected to the movable pulley by connections K. A handle, N, enables the lever L to be easily grasped.

By swinging the lever or arm L about its fulcrum M to the position indicated by dotted lines in Fig. 1 the pulleys H I will be disengaged from one another. The cord D is then free to be wound upon or unwound from the drum E, whereby the frame or carriage G can be moved nearer to or farther from the attaching device B.

By a suitable connecting device, O, any object or weight—such as a lamp, flower-pot, or other article, Q—may be secured to the lever L. Chains or cords P are shown in the drawings as serving to connect the object Q to the lever L. If a lamp is suspended to the lever L, a smoke-bell, R, may be of advantage.

By attaching the weight or object Q to the lever L, as seen in Fig. 1, the action of the weight Q on the lever L is such as to carry the movable pulley I into engagement with the pulley H. The cord D is thus so firmly clamped between the pulleys or rollers H I that the carriage or frame G will be held in a fixed position until the lever L disengages the pulleys H I from one another.

What I claim as new, and desire to secure by Letters Patent, is—

1. The combination, with a suspending medium comprising a fixed portion, C, and a cord, D, of a movable carriage or frame, G, having slots J, a drum, E, pulleys H and I, engaging said cord, one of said pulleys being adapted to move back and forth in said slots, and a spring, V, substantially as described.

2. The combination, with a suspending medium comprising a fixed portion, C, and a cord, D, of a movable carriage or frame, G, provided with slots J, a drum, E, pulleys H and I, engaging said cord, one of said pulleys being adapted to move back and forth in said slots, and a support for a lamp or other article, substantially as described.

3. The combination, with a suspending medium comprising a fixed portion, C, and a cord, D, of a movable carriage or frame, G, provided with slots J, a drum, E, pulleys H and I, engaging said suspending medium, one of said pulleys being adapted to move back and forth in said slots, a weight for normally keeping the pulleys in engagement with one another, and a lever, L, connected with and adapted to move one pulley out of engagement with the other, substantially as described.

4. The combination, with a suspending medium comprising a fixed portion, C, and a cord, D, of a movable carriage or frame, G, provided with slots J, a drum, E, pulleys H and I, engaging said suspending medium, one of the pulleys being adapted to move back and forth in said slots, a swinging lever, L, pivoted to the carriage or frame and having a device, O, for supporting a lamp or other object to normally keep the pulleys in engagement with one another, and connections K between one end of the lever and the movable pulley for throwing the latter out of engagement with the other pulley, substantially as described.

In testimony whereof I have hereunto set my hand and seal in the presence of two subscribing witnesses.

WM. A. PATTEN. [L. S.]

Witnesses:
JOHN D. BALLOU,
JOHN H. COOKE.